(12) United States Patent
Naor et al.

(10) Patent No.: US 11,157,281 B2
(45) Date of Patent: Oct. 26, 2021

(54) PREFETCHING DATA BASED ON REGISTER-ACTIVITY PATTERNS

(71) Applicant: International Business Machines Corporation, Armonk, NY (US)

(72) Inventors: Eyal Naor, Tel-Aviv (IL); Yossi Shapira, Shoham (IL); Yair Fried, Petah Tiqwa (IL); Amir Turi, Ramat Gan (IL)

(73) Assignee: International Business Machines Corporation, Armonk, NY (US)

(*) Notice: Subject to any disclaimer, the term of this patent is extended or adjusted under 35 U.S.C. 154(b) by 420 days.

(21) Appl. No.: 15/988,070

(22) Filed: May 24, 2018

(65) Prior Publication Data
US 2019/0361810 A1 Nov. 28, 2019

(51) Int. Cl.
*G06F 9/345* (2018.01)
*G06F 12/0862* (2016.01)

(52) U.S. Cl.
CPC ........ *G06F 9/3455* (2013.01); *G06F 12/0862* (2013.01); *G06F 2212/602* (2013.01); *G06F 2212/6026* (2013.01)

(58) Field of Classification Search
CPC .............................. G06F 9/3802; G06F 9/3455
See application file for complete search history.

(56) References Cited

U.S. PATENT DOCUMENTS

| | | | |
|---|---|---|---|
| 5,398,319 A * | 3/1995 | Sakamura | G06F 9/30181 |
| | | | 712/226 |
| 5,805,916 A * | 9/1998 | Mallick | G06F 9/30014 |
| | | | 712/217 |
| 6,782,454 B1 | 8/2004 | Damron | |
| 7,093,077 B2 | 8/2006 | Cooksey et al. | |
| 8,156,286 B2 | 4/2012 | Deneau | |
| 8,255,633 B2 | 8/2012 | Boyle et al. | |
| 8,533,422 B2 | 9/2013 | Subramaniam et al. | |
| 9,690,707 B2 | 6/2017 | Chou | |

(Continued)

OTHER PUBLICATIONS

Roth et al., "Dependence Based Prefetching for Linked Data Structures," Proceedings of the Eighth International Conference on Architectural Support for Programming Languages and Operating Systems, 1998, 12 pages http://ftp.cs.wisc.edu/sohi/papers/1998/asplos-prefetch-lds.pdf.

(Continued)

*Primary Examiner* — William B Partridge
(74) *Attorney, Agent, or Firm* — Jared C. Chaney (57) ABSTRACT

Prefetching data by detecting a predefined pattern of register activity of a computer processor by detecting when data, at a memory address pointed to by the sum of an offset value and the contents of a register of the processor during an instruction cycle of the processor, is loaded into the register as a result of processing an instruction, detecting the pattern by detecting when data, at a memory address pointed to by the sum of the offset value and the contents of the register during at least one subsequent instruction cycle, is loaded into the register as a result of again processing the instruction, and prefetching data, into a cache memory of the processor, from a current prefetching memory address, where data, at a memory address pointed to by the sum of the offset value and the contents of the register, is used as the current prefetching memory address.

18 Claims, 3 Drawing Sheets

(56) References Cited

U.S. PATENT DOCUMENTS

| | | | |
|---|---|---|---|
| 2005/0228955 A1* | 10/2005 | Day, III | G06F 12/0862 711/137 |
| 2006/0136190 A1* | 6/2006 | Shibata | G06F 11/3457 703/22 |
| 2007/0156646 A1* | 7/2007 | Komatsu | G06F 16/2438 |
| 2007/0226474 A1* | 9/2007 | Lee | G06F 9/462 712/228 |
| 2011/0231179 A1* | 9/2011 | Stadel | G06F 9/30174 703/26 |
| 2015/0026414 A1* | 1/2015 | Kalamatianos | G06F 12/0862 711/137 |

OTHER PUBLICATIONS

Unknown, "Method for the dynamic prediction of nonsequential memory accesses," An IP.com Prior Art Database Technical Disclosure, IP.com No. IPCOM000009888D, IP.com Electronic Publication Date: Sep. 25, 2002, 4 pages.

Liu et al., "Branch-directed and pointer-based data cache prefetching," Journal of Systems Architecture, Jun. 1999, vol. 45, Issues 12-13, 5 pages, http://www.sciencedirect.com/science/article/pii/S1383762198000502.

\* cited by examiner

PREFETCHING DATA BASED ON REGISTER-ACTIVITY PATTERNS

BACKGROUND

Prefetching is a technique often employed by computer processors to retrieve data from slow-access storage, typically main memory, to fast-access local storage, typically cache memory, before the data is actually needed for processing. Prefetching strategies typically leverage situations in which sequential data items are stored contiguously in statically-allocated memory, such as is typically the case with array-based data that is to be retrieved and processed in the order in which they are stored. Unfortunately, such prefetching strategies are not applicable to sequential data items that are stored non-contiguously, such as in dynamically-allocated memory.

SUMMARY

In one aspect of the invention, a method is provided for prefetching data. The method may include detecting that a first memory address can be expressed as the sum of the contents of a first register of a computer processor and a first memory-address offset value. The method may also include executing, during a first instruction cycle, a first set of instructions that specify the first memory address. The method may include loading, in response to the executing, a first set of data from the first memory address to the first register. The method may also include increasing a first confidence level in response to the detecting and the loading, resulting in a first increased confidence level. The method may also include determining that the first increased confidence level is above a confidence threshold. The method may also include prefetching, in response to the determining, a second set of data from the first memory address into a cache memory of the computer processor.

In one aspect of the invention a system is provided for prefetching data, the method including detecting a predefined pattern of register activity of a computer processor by detecting when data, at a memory address pointed to by the sum of an offset value and the contents of a register of the computer processor during an instruction cycle of the computer processor, is loaded into the register as a result of processing an instruction, detecting the predefined pattern of register activity of the computer processor by detecting when data, at a memory address pointed to by the sum of the offset value and the contents of the register during at least one subsequent instruction cycle of the computer processor, is loaded into the register as a result of again processing the instruction, and prefetching data, into a cache memory of the computer processor, from a current prefetching memory address, where data, at a memory address pointed to by the sum of the offset value and the contents of the register, is used as the current prefetching memory address.

In another aspect of the invention a computer program product embodying the method described above is provided.

Unless otherwise specified, the term "data" as used herein refers to anything that may be loaded into a register of a computer processor, including instructions that are executed by the computer processor and non-instruction data that are otherwise operated upon by the computer processor.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1A:
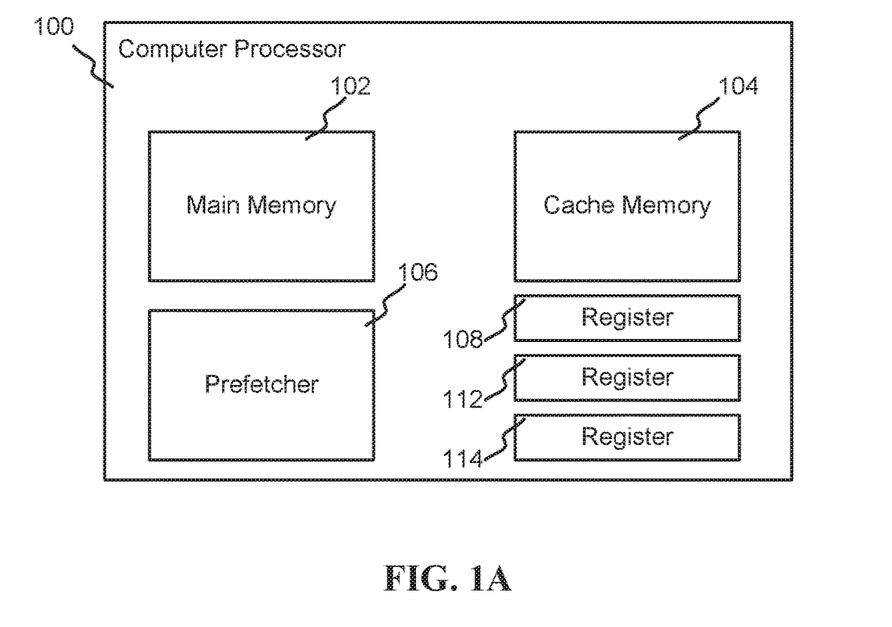
FIG. 1A is a simplified conceptual illustration of a system for prefetching data, constructed and operative in accordance with an embodiment of the invention, in accordance with embodiments.

Reference is now made to FIG. 1A, which is a simplified conceptual illustration of a system for prefetching data, constructed and operative in accordance with an embodiment of the invention. In the system of FIG. 1A, a computer processor 100 is shown including a main memory 102, a cache memory 104, and a prefetcher 106 preferably assembled therewith. Prefetcher 106 is configured in accordance with conventional techniques to detect occurrences of a predefined pattern of register activity of computer processor 100, such as when data, that is stored in main memory 102 at a memory address pointed to by the sum of an offset value and the contents of a register 108 of computer processor 100, is loaded into register 108.

Figure 1B:
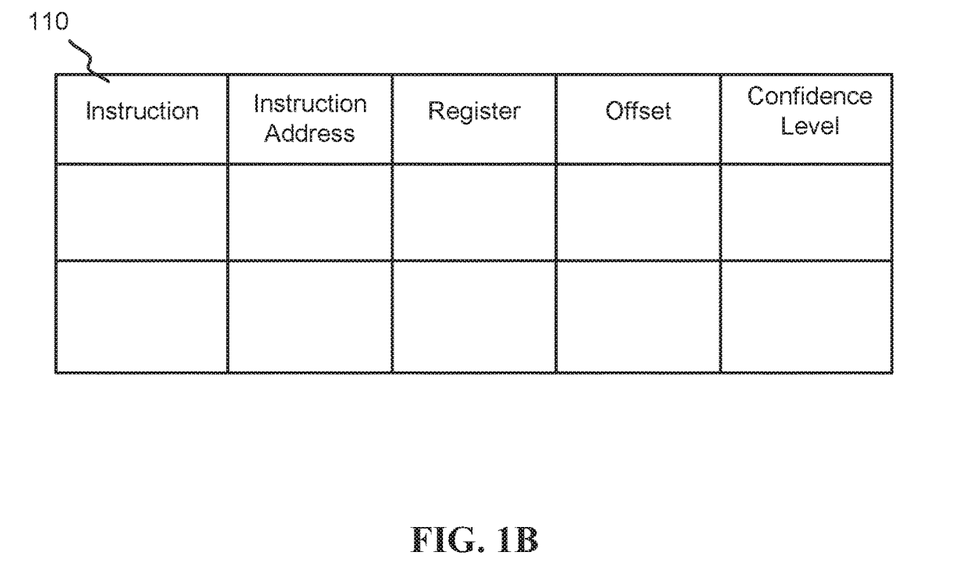
FIG. 1B is an example of a table for recording detected patterns of register activity, in accordance with embodiments.

Prefetcher 106 is configured to detect the predefined pattern of register activity during two or more different instruction cycles of computer processor 100, such as where during each of the instruction cycles the same instruction at the same instruction address is processed and where the sum of the same offset value and the contents of register 108 is used as the memory address from which data is loaded into register 108. Prefetcher 106 is preferably configured in accordance with conventional techniques to maintain a record of a detected predefined pattern of register activity, such as in a table 110, an example of which is shown in FIG. 1B, indicating the predefined pattern of register activity that is encountered for a given instruction at a given instruction address, a given offset value, and a given register during an instruction cycle.

Prefetcher 106 preferably maintains a confidence level associated with a detected predefined pattern of register activity, as in table 110, such as where the confidence level indicates the number of instruction cycles during which the same pattern of register activity is encountered for the same instruction/instruction address, offset value, and register. Once the confidence level reaches a confidence threshold (e.g., a predefined value such as three) for the same pattern of register activity that is encountered for the same instruction/instruction address, offset value, and register, prefetcher 106 preferably prefetches data, such as from main memory 102, into cache memory 104 of computer processor 100.

Prefetcher 106 prefetches the data from a current prefetching memory address, where data, at a memory address pointed to by the sum of the offset value and the contents of register 108, is used as the current prefetching memory address. Prefetcher 106 preferably prefetches a predefined amount of data from the current prefetching memory address, such as a cache line of data that includes data at the current prefetching memory address.

It is appreciated that the instruction cycles during which prefetcher 106 detects the pattern of register activity described herein need not immediately follow each other, but may be separated by one or more instruction cycles during which the pattern of register activity does not occur.

In one embodiment, prefetcher 106 is configured to cause any of the sums described herein of the offset value and the contents of register 108 to be calculated by copying the contents of register 108 into an intermediate register 112 of computer processor 100 and adding the offset value to the contents of intermediate register 112.

In one embodiment, prefetcher 106 is configured to load the prefetch memory address into a register 114 and use the contents of register 114 to prefetch the data.

In one embodiment, prefetcher 106 is configured to determine a next prefetching memory address from the current prefetching memory address, where data, at a memory address pointed to by the sum of the offset value and the current prefetching memory address, is used as the next prefetching memory address. Prefetcher 106 then uses this next prefetching memory address as the current prefetching memory address from which additional data is prefetched as described hereinabove, preferably if they are not currently in cache memory 104. Prefetcher 106 is configured to repeat this process of calculating a next prefetching memory address from the current prefetching memory address and prefetching additional data. Prefetcher 106 is configured to cease prefetching data if a termination condition is met, such as where the termination condition is met after prefetching data a predefined number of times, after a predefined maximum amount of data is prefetched, when any of the memory addresses is a null address pointer, and/or when any of the prefetched data is removed from cache memory 102 without being acted upon by computer processor 100.

Figure 2:
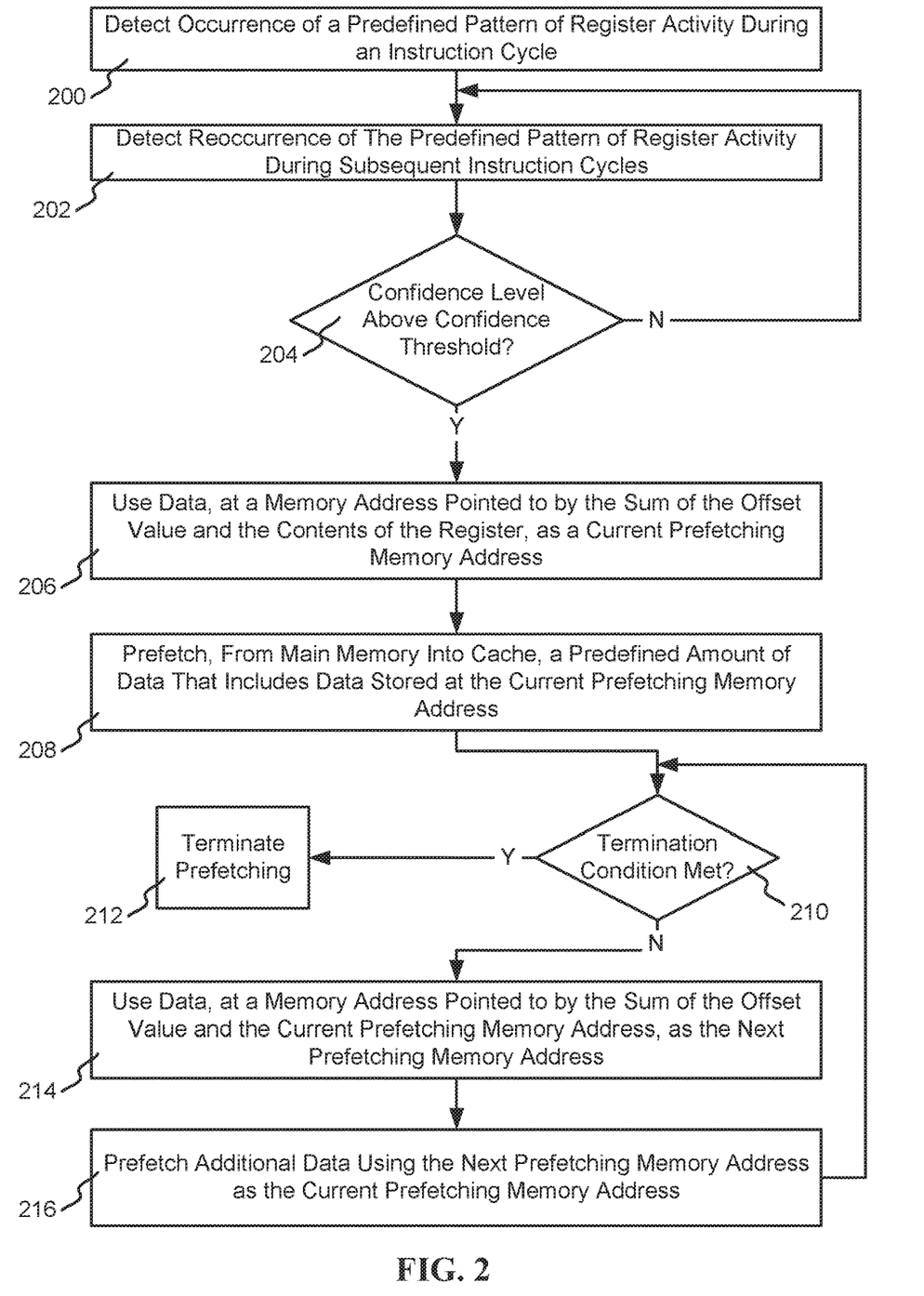
FIG. 2 is a simplified flowchart illustration of an exemplary method of operation of the system of FIG. 1A, operative in accordance with embodiments.

Reference is now made to FIG. 2, which is a simplified flowchart illustration of an exemplary method of operation of the system of FIG. 1A, operative in accordance with an embodiment of the invention. In the method of FIG. 2, an occurrence of a predefined pattern of register activity is detected during an instruction cycle of a computer processor, such as when data, that is stored in main memory at a memory address pointed to by the sum of an offset value and the contents of a register of the computer processor, is loaded back into the register as a result of processing an instruction at a given instruction address (block 200). Further occurrences of the same predefined pattern of register activity are detected during one or more later instruction cycles, where the same instruction at the same instruction address is processed, and where the same offset value and the same register are used (block 202).

In block 204, the confidence level is compared to a confidence threshold. If the confidence level is not above the confidence threshold, the process returns to block 202. However, when a confidence level that is maintained in association with the predefined pattern of register activity exceeds the confidence threshold, data, located at a memory address pointed to by the sum of the offset value and the contents of the register, is used as a current prefetching memory address (block 206). A predefined amount of data, that includes data stored at the current prefetching memory address, is prefetched, such as from main memory, into cache memory of the computer processor (block 208).

After data is prefetched in block 208, it is determined whether a termination condition has been met in block 210. If a termination condition has been met, the prefetching process is terminated in block 212, and no additional data is prefetched.

However, if a termination condition has not been met, a next prefetching memory address is determined from the current prefetching memory address, where data, at a memory address pointed to by the sum of the offset value and the current prefetching memory address, is used as the next prefetching memory address (block 214). The next prefetching memory address is then used as the current prefetching memory address from which additional data is prefetched (block 216). After additional data is prefetched in block 216, it is again determined whether a termination condition has been met in block 210. Blocks 210, 214, and 216 are repeated until a termination condition is met.

Operation of the system of FIG. 1A and the method of FIG. 2 may be illustrated with reference to the following example where prefetching is performed based on detecting the predefined pattern of register activity described hereinabove. In the following example, a computer processor includes registers R1, R2, and R3, as well as a temporary register T1. During the instruction cycle, an instruction located at main memory address W is executed, where the instruction loads, into register R1, a set of data that is located at the main memory address that is pointed to by the sum of the contents of register R3 and the offset value designated as 'offset1'.

As part of or in addition to the execution of this set of instructions, the processor may detect that the main memory address can be expressed as the sum of the contents of register R3 and offset1. In some embodiments, for example, the instructions may specify the main memory address by explicitly stating the memory address, but the processor may detect a relationship between the main memory address, the contents of register R3, and offset1. In other embodiments, the instructions may not explicitly state the main memory address, but may specify the main memory address implicitly. For example, the instructions may direct the processor to calculate the main memory address by adding the contents of register R3 to offset1. The processor may then detect the relationship as a result of this calculation.

During the next instruction cycle, an instruction located at main memory address W+4 bytes is executed, where the instruction loads, into register R2 a set of data that is located at the main memory address that is pointed to by the sum of the contents of register R3 and the offset value designated as 'offset2'. In some embodiments, the relationship between this main memory address, the contents of register R3, and offset2 may be detected by the processor in any of the ways discussed in connection to the relationship in the previous two instruction cycle. In some embodiments, offset2 may be twice as large as offset1.

During the next instruction cycle, an instruction located at main memory address W+8 bytes is executed, where the instruction loads, into register R3, a set of data that is located at the main memory address that is pointed to by the sum of the contents of register R3 and the offset value designated as 'offset3'. In some embodiments, the relationship between this main memory address, the contents of register R3, and offset3 may be detected by the processor in any of the ways discussed in connection to the relationship in the previous two instruction cycle. In some embodiments, offset3 may be three times as large as offset1, and may correspond to the offset value discussed in connection with FIG. 2. As this matches the predefined pattern of register activity, a record associated with the predefined pattern of register activity is maintained as follows:
Instruction Address: W+8 bytes
Register: R3
Offset: offset3
Confidence Level: 1

In some embodiments, the confidence level may have pre-existed these steps, in which case maintaining the record may involve increasing the confidence level. In other embodiments, a confidence level for this pattern may be created, and then increased. In yet other embodiments, a confidence level for this pattern may be created, but may not be increased until the pattern reoccurs.

During the next instruction cycle, an instruction located at main memory address W+12 bytes is executed, where the instruction branches back to the instruction located at main memory address W. The above instructions may be represented as follows:

| Instruction Address: | Instruction: |
|---|---|
| W | Load R1 ← [R3 + offset1] |
| W + 4 | Load R2 ← [R3 + offset2] |
| W + 8 | Load R3 ← [R3 + offset3] |
| W + 12 | Branch W |

Execution of these instructions is repeated, starting with the instruction located at main memory address W. When the instruction located at main memory address W+8 bytes is again executed, this will again match the predefined pattern of register activity, whereupon the confidence level of the record associated with the predefined pattern of register activity will be updated as follows:
Instruction Address: W+8 bytes
Register: R3
Offset: offset3
Confidence Level: 2

If execution of these instructions is performed one or more additional times, the confidence level may reach a predefined value (i.e., a confidence threshold). In various embodiments different amount of pattern occurrences may be required before the confidence level reaches the predefined value. For example, in some embodiments 3 occurrences of the pattern may be required. In other embodiments, 30 occurrences of the pattern may be required. In some embodiments, only one occurrence of the pattern (i.e., the first occurrence) may be required.

When the confidence level reaches the predefined value, a set of data, that is located at the main memory address that is pointed to by the sum of the contents of register R3 and the offset value designated as 'offset3', is loaded into temporary register T1. The contents of temporary register T1 are then used as the current prefetching memory address, and a predefined amount of data that includes the set of data at the current prefetching memory address is prefetched from main memory and into cache memory.

Figure 3:
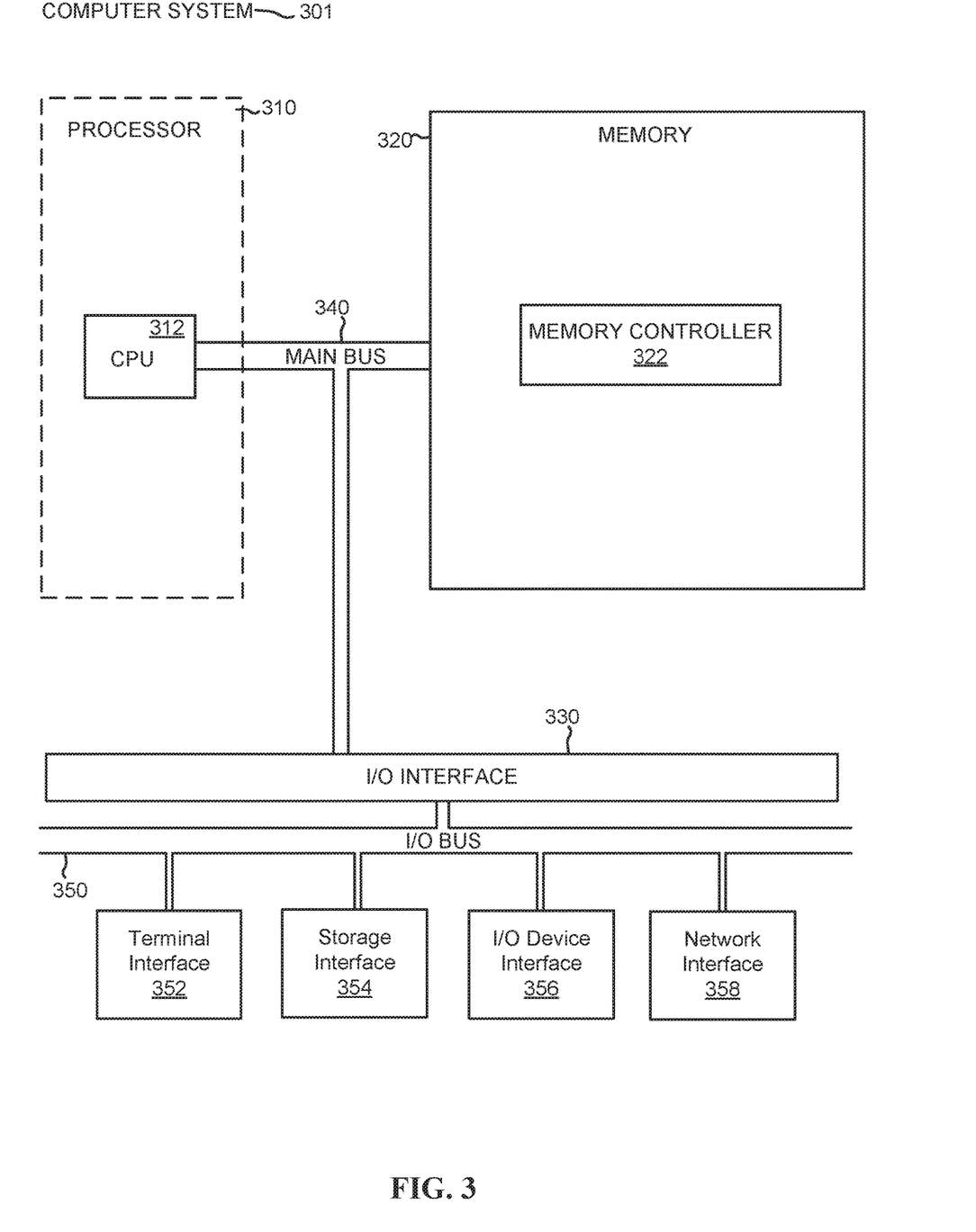
FIG. 3 depicts the representative major components of a computer system that may be used in accordance with embodiments.

FIG. 3 depicts the representative major components of an exemplary Computer System 301 that may be used in accordance with embodiments of the present disclosure. The particular components depicted are presented for the purpose of example only and are not necessarily the only such variations. The Computer System 301 may comprise a Processor 310, Memory 320, an Input/Output Interface (also referred to herein as I/O or I/O Interface) 330, and a Main Bus 340. The Main Bus 340 may provide communication pathways for the other components of the Computer System 301. In some embodiments, the Main Bus 340 may connect to other components such as a specialized digital signal processor (not depicted).

The Processor 310 of the Computer System 301 may be comprised of one or more CPUs 312. The Processor 310 may additionally be comprised of one or more memory buffers or caches (not depicted) that provide temporary storage of instructions and data for the CPU 312. The CPU 312 may perform instructions on input provided from the caches or from the Memory 320 and output the result to caches or the Memory 320. The CPU 312 may be comprised of one or more circuits configured to perform one or methods consistent with embodiments of the present disclosure. In some embodiments, the Computer System 301 may contain multiple Processors 310 typical of a relatively large system. In other embodiments, however, the Computer System 301 may be a single processor with a singular CPU 312.

The Memory 320 of the Computer System 301 may be comprised of a Memory Controller 322 and one or more memory modules for temporarily or permanently storing data (not depicted). In some embodiments, the Memory 320 may comprise a random-access semiconductor memory, storage device, or storage medium (either volatile or non-volatile) for storing data and programs. The Memory Controller 322 may communicate with the Processor 310, facilitating storage and retrieval of information in the memory modules. The Memory Controller 322 may communicate with the I/O Interface 330, facilitating storage and retrieval of input or output in the memory modules. In some embodiments, the memory modules may be dual in-line memory modules.

The I/O Interface 330 may comprise an I/O Bus 350, a Terminal Interface 352, a Storage Interface 354, an I/O Device Interface 356, and a Network Interface 358. The I/O Interface 330 may connect the Main Bus 340 to the I/O Bus 350. The I/O Interface 330 may direct instructions and data from the Processor 310 and Memory 320 to the various interfaces of the I/O Bus 350. The I/O Interface 330 may also direct instructions and data from the various interfaces of the I/O Bus 350 to the Processor 310 and Memory 320. The various interfaces may comprise the Terminal Interface 352, the Storage Interface 354, the I/O Device Interface 356, and the Network Interface 358. In some embodiments, the various interfaces may comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—may communicate failures and changes to one or more components to a hypervisor or operating system (not depicted). The hypervisor or the operating system may allocate the various resources available in the Computer System 301 and track the location of data in Memory 320 and of processes assigned to various CPUs 312. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for prefetching data, the method comprising:
   detecting that a first memory address can be expressed as the sum of the contents of a first register of a computer processor and a first memory-address offset value;
   executing, during a first instruction cycle, a first set of instructions that specify the first memory address;
   loading, in response to executing the first set of instructions during the first instruction cycle, a first set of data from the first memory address into the first register;
   increasing a first confidence level in response to the detecting and to the loading the first set of data into the first register from the first memory address, resulting in a first increased confidence level;
   determining that the first increased confidence level is above a confidence threshold;
   loading the sum of the contents and the first memory-address offset value into a temporary register; and
   prefetching, in response to the determining, a second set of data from the first memory address into a cache memory of the computer processor, wherein the contents of the temporary register are used as the current prefetching memory address;
   identifying, after the prefetching the second set of data, that a termination condition has not been met,
   adding, in response to the identifying that the termination condition has not been met, the first memory-address offset value to the first memory address, resulting in an offset first memory address;
   prefetching a third set of data from the offset first memory address into the cache memory;
   identifying, after the prefetching the third set of data, that a termination condition has not been met; and
   terminating the prefetching process in response to the identifying that the termination condition has been met.

2. The method of claim 1, wherein executing the first set of instructions during the first instruction cycle comprises copying the contents of the first register into an intermediate register and adding the first memory-address offset value to the contents of the intermediate register.

3. The method of claim 1, further comprising:
   executing, during a second instruction cycle, the first set of instructions, wherein the second instruction cycle occurs before the first instruction cycle;
   loading, in response to executing the first set of instructions during the second instruction cycle, a fourth set of data from the first memory address into the first register;
   increasing a second confidence level in response to the detecting and to the loading the fourth set of data into the first register from the first memory address, resulting in the first confidence level; and
   determining that the first confidence level is below the confidence threshold.

4. The method of claim 3, further comprising:
   detecting that a second memory address can be expressed as the sum of the contents of the first register of a computer processor and a second memory-address offset value, wherein the second memory-address offset value is less that the first memory-address offset value;
   executing, during a third instruction cycle, a second set of instructions, wherein the third instruction cycle occurs between a second and the first instruction cycle;
   loading, in response to executing the second set of instructions, a fifth set of data from the second memory address into a second register;
   detecting that a third memory address can be expressed as the sum of the contents of the first register and a third memory-address offset value, wherein the third memory-address offset value is double the second memory-address offset value and less than the first memory-address offset value;
   executing, during a fourth instruction cycle, a fourth set of instructions, wherein the fourth instruction cycle occurs after the third instruction cycle and before the first instruction cycle; and
   loading, in response to executing the fourth set of instructions, a sixth set of data from the third memory address into a third register.

5. The method of claim 1 wherein the termination condition includes that the prefetching has been performed a predefined number of times.

6. The method of claim 1 wherein the termination condition includes that a maximum amount of data has been prefetched.

7. The method of claim 1 wherein the termination condition includes that any of the memory addresses being a null address pointer.

8. The method of claim 1 wherein the termination condition includes any of the prefetched data being removed from the cache memory without being acted upon by the computer processor.

9. A system for prefetching data, the system comprising:
   a computer processor having a cache memory; and
   a prefetcher configured to
     detect a predefined pattern of register activity of the computer processor by detecting when data, at a memory address pointed to by the sum of an offset value and the contents of a register of the computer processor during an instruction cycle of the computer processor, is loaded into the register as a result of processing an instruction,
     detect the predefined pattern of register activity of the computer processor by detecting when data, at the memory address pointed to by the sum of the offset value and the contents of the register during at least one subsequent instruction cycle of the computer processor, is loaded into the register as a result of again processing the instruction,
     load the sum of the contents and the memory address offset value into a temporary register; and
     prefetch data, into a cache memory of the computer processor, from a current prefetching memory address, wherein the contents of the temporary register are used as the current prefetching memory address;
   identify, after the prefetching the second set of data, that a termination condition has not been met,
   add, in response to the identifying that the termination condition has not been met, the first memory-address offset value to the first memory address, resulting in an offset first memory address;
   prefetch a third set of data from the offset first memory address into the cache memory;
   identifying, after the prefetching the third set of data, that a termination condition has not been met; and terminate the prefetching process in response to the identifying that the termination condition has been met.

10. The system of claim 9 wherein the prefetcher is configured to cause any of the sums to be calculated by copying the contents of the register into an intermediate register and adding the offset value to the contents of the intermediate register.

11. The system of claim 9 wherein the prefetcher is configured to
detect, during each of a predefined number of different instruction cycles, when data, at a memory address pointed to by the sum of the offset value and the contents of the register during the different instruction cycle of the computer processor, is loaded into the register, and
prefetch the data if the offset value is the same during each of the predefined number of different instruction cycles.

12. The system of claim 9 wherein the prefetcher is configured to
load the current prefetching memory address into a different register, and
use the contents of the different register to prefetch the data.

13. The system of claim 9 wherein the prefetcher is configured to cease prefetching the data if a termination condition is met.

14. The system of claim 13 wherein the termination condition includes the prefetching being performed a predefined number of times.

15. The system of claim 13 wherein the termination condition includes a maximum amount of data being prefetched.

16. The system of claim 13 wherein the termination condition includes any of the memory addresses being a null address pointer.

17. The system of claim 13 wherein the termination condition includes any of the prefetched data being removed from the cache memory without being acted upon by the computer processor.

18. A computer program product, the computer program product comprising a computer readable storage medium having program instructions embodied therewith, the program instructions executable by a computer to cause the computer to:
detect that a first memory address can be expressed as the sum of the contents of a first register of a computer processor and a first memory-address offset value;
execute, during a first instruction cycle, a first set of instructions that specify the first memory address;
load, in response to executing the first set of instructions during the first instruction cycle, a first set of data from the first memory address into the first register;
increase a first confidence level in response to the detecting and to the loading the first set of data into the first register from the first memory address, resulting in a first increased confidence level;
determine that the first increased confidence level is above a confidence threshold;
load the sum of the contents and the first memory-address offset value into a temporary register;
prefetch, in response to the determining, a second set of data from the first memory address into a cache memory of the computer processor, wherein the contents of the temporary register are used as the current prefetching memory address;
identify, after the prefetching the second set of data, that a termination condition has not been met,
add, in response to the identifying that the termination condition has not been met, the first memory-address offset value to the first memory address, resulting in an offset first memory address;
prefetch a third set of data from the offset first memory address into the cache memory;
identify, after the prefetching the third set of data, that a termination condition has not been met; and
terminate the prefetching process in response to the identifying that the termination condition has been met.

* * * * *